United States Patent
Vobbilisetty et al.

(10) Patent No.: US 10,284,469 B2
(45) Date of Patent: *May 7, 2019

(54) PROGRESSIVE MAC ADDRESS LEARNING

(71) Applicant: AVAGO TECHNOLOGIES INTERNATIONAL SALES PTE. LIMITED, Singapore (SG)

(72) Inventors: Suresh Vobbilisetty, San Jose, CA (US); Mythilikanth Raman, San Jose, CA (US); Phanidhar Koganti, Fremont, CA (US); Raju Shekarappa, Cupertino, CA (US); Mahesh K. Pujara, Cupertino, CA (US); Pankaj K. Jha, Fremont, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/720,873

(22) Filed: Sep. 29, 2017

(65) Prior Publication Data

US 2018/0026889 A1    Jan. 25, 2018

Related U.S. Application Data

(63) Continuation of application No. 14/822,380, filed on Aug. 10, 2015, now Pat. No. 9,807,007.

(Continued)

(51) Int. Cl.
*H04L 12/741* (2013.01)
*H04L 12/24* (2006.01)
(Continued)

(52) U.S. Cl.
CPC ............ *H04L 45/745* (2013.01); *H04L 41/12* (2013.01); *H04L 49/3009* (2013.01); *H04L 45/66* (2013.01); *H04W 88/14* (2013.01)

(58) Field of Classification Search
CPC ... H04L 45/745; H04L 41/12; H04L 49/2009; H04L 45/66; H04W 88/14
(Continued)

(56) References Cited

U.S. PATENT DOCUMENTS

| 829,529 A | 8/1986 | Keathley |
| 5,390,173 A | 2/1995 | Spinney |

(Continued)

FOREIGN PATENT DOCUMENTS

| CN | 1735062 | 2/2006 |
| CN | 1777149 | 5/2006 |

(Continued)

OTHER PUBLICATIONS

Eastlake, D. et al., 'RBridges: TRILL Header Options', Dec. 24, 2009, pp. 1-17, TRILL Working Group.

(Continued)

*Primary Examiner* — Brenda H Pham
(74) *Attorney, Agent, or Firm* — Xsensus, LLP

(57) ABSTRACT

One embodiment of the present invention provides a switch in a network of interconnected switches. The switch includes a storage device, a hardware management apparatus, and a layer-2 management apparatus. The storage device stores a forwarding table, which includes an entry comprising a MAC address and an egress port for the MAC address. The hardware management apparatus determines whether a destination MAC address of a frame is present in a hardware table in memory of the switch. The layer-2 management apparatus, in response to a determination that the destination MAC address is not present in the hardware table, looks up a first entry comprising the destination MAC address in the forwarding table, and creates a second entry comprising the destination MAC address in the hardware table based on the first entry.

20 Claims, 12 Drawing Sheets

Related U.S. Application Data

(60) Provisional application No. 62/042,076, filed on Aug. 26, 2014, provisional application No. 62/035,901, filed on Aug. 11, 2014.

(51) Int. Cl.
*H04L 12/935* (2013.01)
*H04W 88/14* (2009.01)
*H04L 12/721* (2013.01)

(58) Field of Classification Search
USPC .......................................................... 370/392
See application file for complete search history.

(56) References Cited

U.S. PATENT DOCUMENTS

| | | |
|---|---|---|
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,122,639 A | 9/2000 | Babu |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,816,462 B1 | 11/2004 | Booth, III |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim et al. |
| 7,173,934 B2 | 2/2007 | Lapuh |
| 7,197,308 B2 | 3/2007 | Singhal |
| 7,206,288 B2 | 4/2007 | Cometto |
| 7,274,694 B1 | 9/2007 | Cheng |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,653,056 B1 | 1/2010 | Dianes |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Venkataraman |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |

(56) References Cited

U.S. PATENT DOCUMENTS

| | | |
|---|---|---|
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |
| 9,524,173 B2 | 12/2016 | Guntaka |
| 9,626,255 B2 | 4/2017 | Guntaka |
| 9,628,407 B2 | 4/2017 | Guntaka |
| 9,807,007 B2 * | 10/2017 | Vobbilisetty .......... H04L 45/745 |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1 | 9/2002 | Tingley |
| 2002/0161867 A1 | 10/2002 | Cochran |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0110068 A1 | 5/2007 | Sekiguchi |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1 | 8/2007 | Boyd |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2007/0297406 A1 | 12/2007 | Rooholamini |
| 2008/0052487 A1 | 2/2008 | Akahane |
| 2008/0056135 A1 | 3/2008 | Lee |

(56) References Cited

U.S. PATENT DOCUMENTS

| | | |
|---|---|---|
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1 | 11/2008 | Friskney |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | Halna DeFRETAY |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1 | 8/2009 | Devireddy |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085557 A1 | 4/2011 | Gnanasekaran |

(56) References Cited

U.S. PATENT DOCUMENTS

| | | |
|---|---|---|
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | VanDerMerwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0003747 A1 | 1/2013 | Raman |
| 2013/0016606 A1 | 1/2013 | Cirkovic |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0121142 A1 | 5/2013 | Bai |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0163591 A1 | 6/2013 | Shukla |
| 2013/0194914 A1 | 8/2013 | Agarwal |
| 2013/0201992 A1 | 8/2013 | Masaki |
| 2013/0215754 A1 | 8/2013 | Tripathi |
| 2013/0219473 A1 | 8/2013 | Schaefer |
| 2013/0223221 A1 | 8/2013 | Xu |
| 2013/0223438 A1 | 8/2013 | Tripathi |
| 2013/0223449 A1 | 8/2013 | Koganti |
| 2013/0238802 A1 | 9/2013 | Sarikaya |
| 2013/0250947 A1 | 9/2013 | Zheng |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |

(56) References Cited

U.S. PATENT DOCUMENTS

| | | |
|---|---|---|
| 2013/0301425 A1 | 11/2013 | Udutha |
| 2013/0301642 A1 | 11/2013 | Radhakrishnan |
| 2013/0308492 A1 | 11/2013 | Baphna |
| 2013/0308641 A1 | 11/2013 | Ackley |
| 2013/0308647 A1 | 11/2013 | Rosset |
| 2013/0315125 A1 | 11/2013 | Ravishankar |
| 2013/0315246 A1 | 11/2013 | Zhang |
| 2013/0315586 A1 | 11/2013 | Kipp |
| 2013/0322427 A1 | 12/2013 | Stiekes |
| 2013/0329605 A1 | 12/2013 | Nakil |
| 2013/0332660 A1 | 12/2013 | Talagala |
| 2013/0336104 A1 | 12/2013 | Talla |
| 2013/0346583 A1 | 12/2013 | Low |
| 2014/0010239 A1 | 1/2014 | Xu |
| 2014/0013324 A1 | 1/2014 | Zhang |
| 2014/0019608 A1 | 1/2014 | Kawakami |
| 2014/0019639 A1 | 1/2014 | Ueno |
| 2014/0025736 A1 | 1/2014 | Wang |
| 2014/0029412 A1 | 1/2014 | Janardhanan |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Sun |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0188996 A1 | 7/2014 | Lie |
| 2014/0192804 A1 | 7/2014 | Ghanwani |
| 2014/0195695 A1 | 7/2014 | Okita |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269709 A1 | 9/2014 | Benny |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0348168 A1 | 11/2014 | Singh |
| 2014/0355477 A1 | 12/2014 | Velayudhan |
| 2014/0362854 A1 | 12/2014 | Addanki |
| 2014/0362859 A1 | 12/2014 | Addanki |
| 2014/0376550 A1 | 12/2014 | Khan |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0103826 A1 | 4/2015 | Davis |
| 2015/0110111 A1 | 4/2015 | Song |
| 2015/0110487 A1 | 4/2015 | Fenkes |
| 2015/0117256 A1 | 4/2015 | Sabaa |
| 2015/0117454 A1 | 4/2015 | Koponen |
| 2015/0127014 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0188770 A1 | 7/2015 | Naiksatam |
| 2015/0195093 A1 | 7/2015 | Mahadevan |
| 2015/0222506 A1 | 8/2015 | Kizhakkiniyil |
| 2015/0248298 A1 | 9/2015 | Gavrilov |
| 2015/0263897 A1 | 9/2015 | Ganichev |
| 2015/0263899 A1 | 9/2015 | Tubaltsev |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0212040 A1 | 7/2016 | Bhagavathiperumal |
| 2016/0344640 A1 | 11/2016 | Soderlund |
| 2017/0012880 A1 | 1/2017 | Yang |
| 2017/0026197 A1 | 1/2017 | Venkatesh |
| 2017/0097841 A1 | 4/2017 | Chang |
| 2018/0013614 A1 | 1/2018 | Vobbilisetty |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].

Office Action dated Jun. 18, 2015, U.S. Appl. No. 13/098,490, filed May 2, 2011.

Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/Globecom.2009.5360776 ISBN: 1-4244-5626-0 [retrieved on Jul. 19, 2011].

TRILL Working Group Internet-Draft Intended status: Proposed Standard RBridges: Base Protocol Specificaiton Mar. 3, 2010.

Office Action dated Jun. 16, 2015, U.S. Appl. No. 13/048,817, filed Mar. 15, 2011.

Knight P. et al: 'Layer 2 and 3 Virtual Private Networks: Taxonomy, Technology, and Standardization Efforts', IEEE Communications

(56) References Cited

OTHER PUBLICATIONS

Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Office Action for U.S. Appl. No. 13/092,873, filed Apr. 22, 2011, dated Nov. 29, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', BROCADE white paper, http://community.brocade.com/docs/DOC-2954, Dec. 3, 2012.
'RBridges: Base Protocol Specification', IETF Draft, Perlman et al., Jun. 26, 2009.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated Jun. 8, 2015, U.S. Appl. No. 14/178,042, filed Feb. 11, 2014.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Oct. 2, 2014, U.S. Appl. No. 13/092,752, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office Action dated May 21, 2015, U.S. Appl. No. 13/288,822, filed Nov. 3, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office action dated Apr. 30, 2015, U.S. Appl. No. 13/351,513, filed Jan. 17, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.

(56) References Cited

OTHER PUBLICATIONS

Office Action dated Feb. 20, 2014, U.S. Appl. No. 13/598,204, filed Aug. 29, 2012.
Office Action dated Apr. 1, 2015 U.S. Appl. No. 13/656,438, filed Oct. 19, 2012.
Office Action dated Jun. 6, 2014, U.S. Appl. No. 13/669,357, filed Nov. 5, 2012.
Office Action dated Jun. 10, 2015, U.S. Appl. No. 13/890,150, filed May 8, 2013.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Brocade 'Brocade Unveils 'The Effortless Network, http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Kompella, Ed K. et al., 'Virtual Private LAN Service (VPLS) Using BGP for Auto-Discovery and Signaling' Jan. 2007.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Mahalingam "VXLAN: A Framework for Overlaying Virtualized Layer 2 Networks over Layer 3 Networks" Oct. 17, 2013 pp. 1-22, Sections 1, 4 and 4.1.
Mckeown, Nick et al. "OpenFlow: Enabling Innovation in Campus Networks", Mar. 14, 2008, www.openflow.org/documents/openflow-wp-latest.pdf.
Narten, T. et al., 'Problem Statement: Overlays for Network Virtualization d raft-na rten-n vo3-over l ay-problem -statement-01', Oct. 31, 2011.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,752, filed Apr. 22, 2011, from Park, Jung H., dated Jul. 18, 2013.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Feb. 23, 2015.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.

(56) References Cited

OTHER PUBLICATIONS

Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/044,301, filed Mar. 9, 2011, dated Jan. 29, 2015.
Office Action for U.S. Appl. No. 13/044,301, dated Mar. 9, 2011.
Office Action for U.S. Appl. No. 13/050,102, filed Mar. 17, 2011, dated Jan. 26, 2015.
Office Action for U.S. Appl. No. 13/087,239, filed Apr. 14, 2011, dated Dec. 5, 2012.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/365,808, filed Jul. 18, 2013, dated Jul. 18, 2013.
Office Action for U.S. Appl. No. 13/425,238, filed Mar. 20, 2012, dated Mar. 12, 2015.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for Application No. 13/851,026, filed Mar. 26, 2013, dated Jan. 30, 2015.
Office Action for U.S. Appl. No. 14/577,785, filed Dec. 19, 2014, dated Apr. 13, 2015.
Office Action for U.S. Appl. No. 13/092,887, dated Jan. 6, 2014.
Perlman, Radia et al., 'Challenges and Opportunities in the Design of TRILL: a Routed layer 2 Technology', 2009.
Rosen, E. et al., "BGP/MPLS VPNs", Mar. 1999.
S. Nadas et al., 'Virtual Router Redundancy Protocol (VRRP) Version 3 for IPv4 and IPv6', Internet Engineering Task Force, Mar. 2010.
Siamak Azodolmolky et al. "Cloud computing networking: Challenges and opportunities for innovations", IEEE Communications Magazine, vol. 51, No. 7, Jul. 1, 2013.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.

(56) References Cited

OTHER PUBLICATIONS

Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/817,097, dated May 4, 2017.
Office Action for U.S. Appl. No. 14/872,966, dated Apr. 4, 2017.
Office Action for U.S. Appl. No. 14/680,915, dated May 4, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action for U.S. Appl. No. 14/216,292, dated Oct. 7, 2017.
Office Action dated Oct. 25, 2017, U.S. Appl. No. 14/867,865, filed Sep. 28, 2015.
Office action dated Oct. 26, 2017, U.S. Appl. No. 14/817,097, filed Aug. 3, 2015.
Office Action dated Mar. 20, 2018, U.S. Appl. No. 14/867,865, filed Sep. 28, 2015.
Office Action dated Jun. 13, 2018, U.S. Appl. No. 13/786,328, filed Mar. 5, 2013.
IEEE et al., "Amendment to Carrier Sense Multiple Access with Collision Detection (CSMA/CD) Access Method and Physical Layer Specifications—Aggregation of Multiple Link Segments", Mar. 30, 2000, IEEE Computer Society, IEEE Std 802.3ad-2000, pp. 116-117.
Office Action dated Jul. 13, 2018, U.S. Appl. No. 15/402,924, filed Jul. 13, 2018.
Office Action dated Jul. 24, 2018, U.S. Appl. No. 14/799,371, filed Jul. 24, 2018.

\* cited by examiner

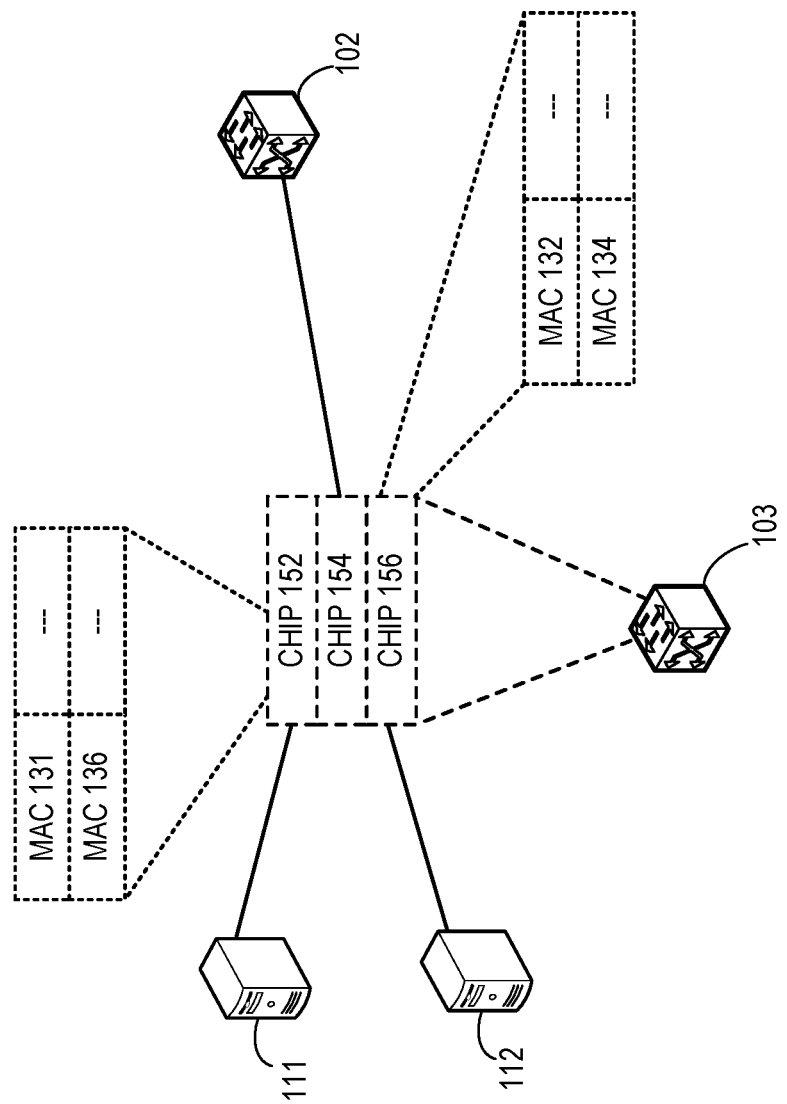

PROGRESSIVE MAC ADDRESS LEARNING

RELATED APPLICATIONS

This application is a continuation application of application Ser. No. 14/822,380, Attorney Docket Number BRCD-3320.1.US.NP, titled "Progressive MAC Address Learning," by inventors Suresh Vobbilisetty, Mythilikanth Raman, Phanidhar Koganti, Raju Shekarappa, Mahesh K. Pujara, and Pankaj K. Jha, filed on 10 Aug. 2015, which claims the benefit of U.S. Provisional Application No. 62/035,901, titled "Conversational MAC Leaning," by inventors Suresh Vobbilisetty, Mythilikanth Raman, Phanidhar Koganti, Raju Shekarappa, Mahesh K. Pujara, and Pankaj K. Jha, filed on 11 Aug. 2014, and U.S. Provisional Application No. 62/042,076, titled "Conversational MAC Leaning," by inventors Suresh Vobbilisetty, Mythilikanth Raman, Phanidhar Koganti, Raju Shekarappa, Mahesh K. Pujara, and Pankaj K. Jha, filed on 26 Aug. 2014, the disclosures of which are incorporated by reference herein.

The present disclosure is related to U.S. Pat. No. 8,867,552, Attorney Docket Number BRCD-3008.1.US.NP, titled "Virtual Cluster Switching," by inventors Suresh Vobbilisetty and Dilip Chatwani, issued on 21 Oct. 2014, and U.S. Pat. No. 9,270,486, titled "Name Services for Virtual Cluster Switching," by inventors Suresh Vobbilisetty, Phanidhar Koganti, and Jesse B. Willeke, issued on 23 Feb. 2016, the disclosures of which are incorporated by reference herein.

BACKGROUND

Field

This disclosure relates to communication networks. More specifically, this disclosure relates to a system and method for efficient media access control (MAC) address learning.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as network virtualization and multi-tenancy, to accommodate diverse network demands efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 and layer-3 (e.g., Ethernet and Internet Protocol (IP), respectively) switching technologies continue to evolve. IP facilitates routing and end-to-end data transfer in wide area networks (WANs) while providing safeguards for error-free communication. On the other hand, more routing-like functionalities are migrating into layer-2. Notably, the development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As Internet traffic becomes more diverse, network virtualization is becoming progressively more important as a value proposition for network architects. In addition, the evolution of virtual computing has made multi-tenancy attractive and, consequently, placed additional requirements on the network. For example, a switch may couple a large number of virtual servers and learn the virtual MAC addresses of the virtual servers. It is often desirable that the network infrastructure can provide a scalable MAC address management for a large number of end devices.

While today's networks support many desirable features, some issues remain unsolved in efficiently facilitating scalable MAC address learning.

SUMMARY

One embodiment of the present invention provides a switch in a network of interconnected switches. The switch includes a storage device, a hardware management apparatus, and a layer-2 management apparatus. The storage device stores a forwarding table, which includes an entry comprising a media access control (MAC) address and an egress port for the MAC address. The hardware management apparatus determines whether a destination MAC address of a frame is present in a hardware table in memory of the switch. The layer-2 management apparatus, in response to a determination that the destination MAC address is not present in the hardware table, looks up a first entry comprising the destination MAC address in the forwarding table, and creates a second entry comprising the destination MAC address in the hardware table based on the first entry.

In a variation on this embodiment, the switch also includes a learning management apparatus, which learns a first MAC address from a local edge port. The layer-2 management apparatus then creates respective entries in the forwarding and hardware tables comprising the learned MAC address.

In a variation on this embodiment, the switch also includes a learning management apparatus, which extracts a remote MAC address learned at a port of a second switch from a payload of a notification message. The layer-2 management apparatus then creates an entry in the forwarding table comprising the remote MAC address.

In a variation on this embodiment, the layer-2 management apparatus, in response to a determination that the destination MAC address is present in the hardware table, identifies an egress port for the frame from an entry comprising the destination MAC address in the hardware table.

In a variation on this embodiment, if the frame has been received via a first port in a first chip of the switch, the layer-2 management apparatus is precluded from creating an entry comprising the destination MAC address in a hardware table of a second chip of the switch.

In a variation on this embodiment, the layer-2 management apparatus clears the second entry in response to identifying an aging out event for the destination MAC address. However, the first entry remains in the forwarding table.

In a further variation, the layer-2 management apparatus clears the first entry in response to identifying an aging out event of a remote switch in a notification message. The destination MAC address has been learned at a port in the remote switch.

In a variation on this embodiment, the switch and a remote switch participate in a virtual link aggregation group coupling an end device with the switch and the remote switch. The hardware table of the switch includes at least one different MAC address than a remote hardware table of the remote switch.

In a variation on this embodiment, the layer-2 management apparatus, in response to determining a failure to the lookup, floods the frame in the network.

In a variation on this embodiment, the network is a switch group operating as a single Ethernet switch. A respective switch of the network is associated with a group identifier identifying the switch group.

BRIEF DESCRIPTION OF THE FIGURES

FIG. 1C illustrates exemplary progressive MAC address learning in switch hardware, in accordance with an embodiment of the present invention.

In the figures, like reference numerals refer to the same figure elements.

DETAILED DESCRIPTION

Figure 1A:
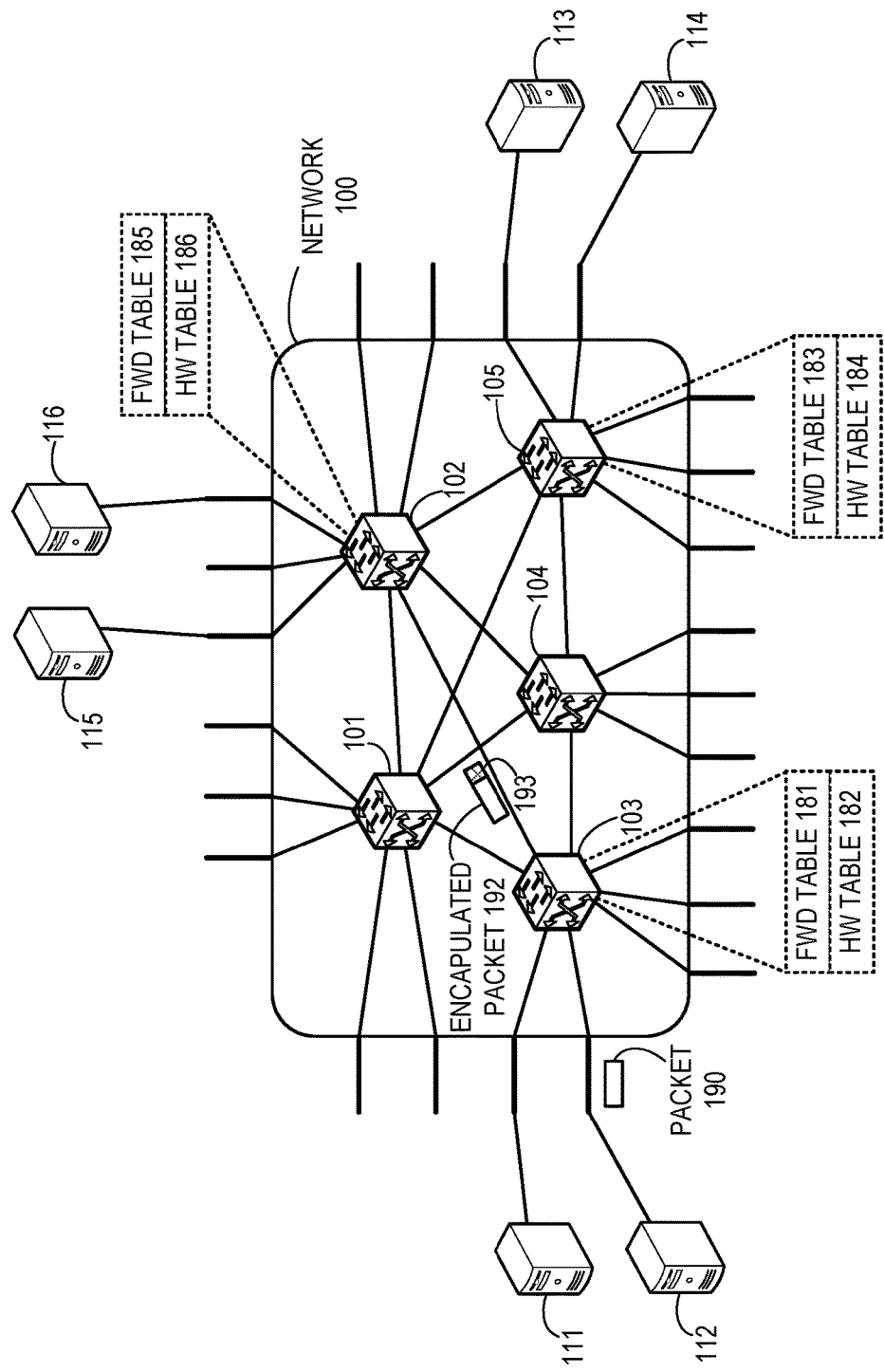
FIG. 1A illustrates an exemplary network with support for progressive media access control (MAC) address learning, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating scalable MAC address learning in a switch is solved by incorporating only the MAC addresses currently in use in the switch in the hardware table of the switch. With existing technologies, an end device can operate as a host machine with a plurality of virtual machines, each of which may have multiple MAC addresses. As a result, a switch coupling a large number of such servers may need to learn a large number of MAC addresses. Furthermore, in a network, such as a fabric switch, where a learned MAC address is shared among the member switches of the network, the burden of a respective switch learning a respective MAC address can be significant. This can become a bottleneck for scaling up such a network.

To solve this problem, embodiments of the present invention allow a switch in a network to identify conversational MAC addresses (i.e., the MAC addresses in use in active communications). The switch can learn a MAC address via a local edge port (e.g., based on Ethernet MAC address learning) or from the payload of a notification message from a remote switch (e.g., in a fabric switch). The switch creates an entry comprising a respective learned MAC address and a corresponding egress port identifier in a forwarding table (e.g., a software table). If the switch identifies a remotely learned MAC address as a destination MAC address, the switch considers that MAC address as a conversational MAC address. The switch also considers a locally learned MAC address as a conversational MAC address since it has received at least one packet from that MAC address.

The switch then incorporates the entry comprising the conversational MAC address from the forwarding table into the local hardware table (e.g., an Exact Match (EXM) Table in the Content Addressable Memory (CAM)). As a result, the hardware table only includes the MAC address currently in use in an active communication at the switch. In this way, the switch uses its limited hardware table resources for the MAC addresses currently in use, thereby allowing the switch to support a large number of active communications and scale up a network.

In some embodiments, the network is a fabric switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a VCS identifier), which is assigned to the fabric switch. A respective member switch of the fabric switch is associated with the fabric identifier. Furthermore, when a member switch of a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared with a respective member switch of the fabric switch.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end device" can refer to any device external to a network (e.g., which does not perform forwarding in that network). Examples of an end device include, but are not limited to, a physical or virtual machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the network. An end device hosting one or more virtual machines can be referred to as a host machine. In this disclosure, the terms "end device" and "host machine" are used interchangeably.

The term "hypervisor" is used in a generic sense, and can refer to any virtual machine manager. Any software, firmware, or hardware that creates and runs virtual machines can be a "hypervisor." The term "virtual machine" is also used in a generic sense and can refer to software implementation of a machine or device. Any virtual device which can execute a software program similar to a physical device can be a "virtual machine." A host external device on which a hypervisor runs one or more virtual machines can be referred to as a "host machine."

The term "VLAN" is used in a generic sense, and can refer to any virtualized network. Any virtualized network comprising a segment of physical networking devices, software network resources, and network functionality can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/ rfc6325, which is incorporated by reference herein. Embodiments of the present invention are not limited to application among RBridges. Other types of switches, routers, and forwarders can also be used.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary network with support for progressive media access control (MAC) address learning, in accordance with an embodiment of the present invention. As illustrated in FIG. 1A, a network 100 includes member switches 101, 102, 103, 104, and 105. Network 100 can be a TRILL network and a respective member switch, such as switch 103, can be a TRILL RBridge. Network 100 can also be an IP network and a respective member switch, such as switch 103, can be an IP-capable switch, which calculates and maintains a local IP routing table (e.g., a routing information base or RIB), and is capable of forwarding packets based on its IP addresses. In some embodiments, network 100 is a fabric switch, and one or more switches in fabric switch 100 can be virtual switches (e.g., a software switch running on a computing device).

Switch 103 is coupled to end devices 111 and 112, switch 105 is coupled to end devices 113 and 114, and switch 102 is coupled to end devices 115 and 116. Member switches in network 100 use edge ports to communicate with end devices and inter-switch ports to communicate with other member switches. For example, switch 103 is coupled to end devices 111 and 112 via edge ports and to switches 101, 102, and 104 via inter-switch ports. End devices 111 and 112 can reside within the same local area network. As a result, a packet from end device 111 to end device 112 can be forwarded without switch 103 forwarding it.

With existing technologies, end devices 111-116 can operate as host machines hosting a plurality of virtual machines, each of which may have multiple MAC addresses. As a result, switches 102, 103, and 105 may need to learn a large number of MAC addresses. If network 100 is a fabric switch, where a learned MAC address is shared among the member switches, the burden of a respective switch in network 100 learning a respective MAC address can be significant. This can become a bottleneck for scaling up network 100.

To solve this problem, switches in network 100 can identify conversational MAC addresses. During operation, a switch in network 100, such as switch 103, learns end device 111's MAC address via a local edge port (e.g., based on Ethernet MAC address learning). Upon learning the MAC address, switch 103 creates an entry comprising the MAC address and a corresponding egress port identifier of the port coupling end device 111 in a forwarding table 181 (e.g., a software table, such as a forwarding database). In some embodiments, switch 103 creates a notification message, includes the learned MAC address in the notification message, and sends the notification message to other switches in network 100.

Upon receiving the notification message, a respective other switch stores the learned MAC address in the local forwarding table in association with switch 103's identifier. For example, switch 102 stores the learned MAC address and switch 103's identifier in forwarding table 185. In some embodiments, the entry includes a bitmap indicating the MAC address's association with switch 103. For example, network 100 includes five switches. Hence, a bitmap of five bits can indicate the association between a MAC address and a corresponding switch. For example, the entry in forwarding table 185 can include a bitmap "00100," which indicates that the MAC address is associated with switch 103.

Similarly, switch 105 learns end device 113's MAC address via a local edge port and creates an entry comprising the MAC address and a corresponding egress port identifier in a forwarding table 183. In the same way, switch 102 learns end device 115's MAC address via a local edge port and creates an entry comprising the MAC address and a corresponding egress port identifier in a forwarding table 185. Switches 102 and 105 can also share the respective learned MAC addresses with other switches in network 100. As a result, switch 103 learns the MAC addresses of end devices 113 and 115, and stores them in forwarding table 181. A respective switch in network 100, either locally or remotely, can also learn the respective MAC addresses of end devices 112, 114, and 116.

However, a switch in network 100 only includes the locally learned MAC addresses in the hardware table (e.g., the EXM table in a CAM). For example, switch 103 only includes the MAC addresses of end devices 111 and 112 in local hardware table 182. Similarly, switch 105 includes the MAC addresses of end devices 113 and 114 in local hardware table 184, and switch 102 includes the MAC addresses of end devices 115 and 116 in local hardware table 186. A switch includes an entry comprising a remotely learned MAC address in a local hardware table if that MAC address is in use in an active communication (i.e., is a conversational MAC address).

During operation, end device 112 sends a packet 190 to end device 116. Switch 103 receives the packet and learns the source MAC address of packet 190 (i.e., end device 112's MAC address), as described above. Switch 103 determines that the destination MAC address of packet 190 is not present in hardware table 182. Switch 103 then checks whether the MAC address is present in forwarding table 181. Since switch 103 has learned end device 116's MAC address from a notification message from switch 102, forwarding table 181 includes an entry comprising end device 116's MAC address and the switch identifier of switch 102. Switch 102 then creates a corresponding entry in hardware table 182 with end device 116's MAC address and a corresponding egress port.

In some embodiments, the unavailability of end device 116's MAC address in hardware table 182 causes an exception at switch 103. This exception can be triggered at the edge ports of switch 103. In response to the exception, switch 103 consults forwarding table 181 to check whether forwarding table 181 includes end device 116's MAC address. Without the support for maintaining a conversational MAC address, switch 103 floods network 100 if a destination MAC address is not present in forwarding table 181. The support for maintaining the conversational MAC address can be indicated by a set value of a Learning in Progress (LiP) bit in switch 103.

Switch 103 thus determines the destination MAC address of packet 190 as a conversational MAC address and creates an entry in hardware table 182 based on the corresponding entry in forwarding table 181. In some embodiments, switch 103 also sets a flag of the entry in the forwarding table indicating that the MAC address is a conversational MAC address. Switch 103 can also add the entry in a download list (e.g., can add the index of the entry in the download list). The layer-2 management apparatus of switch 103 consults the download list and generates the corresponding entries of the download list in hardware table 182.

In this way, hardware table 182 only includes the MAC address currently in use in an active communication at switch 103. This allows switch 103 to use the limited resources of hardware table 182 for the conversational MAC addresses, thereby allowing switch 103 to support a large number of active communications. Upon crating the entry in hardware table 182, switch 103 encapsulates packet 190 in an encapsulation header 193 and generates encapsulated packet 192. Switch 103 includes switch 102's switch identifier as the egress switch identifier in encapsulation header 193 based on the entry in hardware table 182. Switch 103 then forwards encapsulated packet 192 based on the forwarding entry in hardware table 182.

Encapsulation header 193 can be a fabric encapsulation header (e.g., an encapsulation header used to forward the packet in a fabric switch) or a tunnel header (e.g., an encapsulation header used to forward the packet via a tunnel). Examples of a fabric encapsulation header include, but are not limited to, a TRILL header, an IP header, an Ethernet header, and a combination thereof. Examples of a tunnel include, but are not limited to, Virtual Extensible Local Area Network (VXLAN), Generic Routing Encapsulation (GRE), and its variations, such as Network Virtualization using GRE (NVGRE) and openvSwitch GRE. The VLAN identifier of a global VLAN can be included in the encapsulation header.

If switch 103 does not find an unknown destination MAC address of a packet in forwarding table 181, switch 103 creates an entry comprising the unknown destination MAC address in forwarding table 181 and indicates that the corresponding packet has been flooded in network 100. Switch 103 can also create an entry with the MAC address in hardware table 182, indicate flooding in the corresponding virtual local area network (VLAN), and clear the LiP bit. Indicating in the entry that the packet has been flooded ensures that there are not further exceptions for the same MAC address. When switch 103 receives the switch identifier associated with the MAC address, switch 103 updates the corresponding entries in tables 181 and 182.

In some embodiments, progressive MAC address learning supports protection against Denial of Service (DoS) attacks. Upon identifying the exception, switch 103 identifies the corresponding conversational MAC address from forwarding table 181 and includes it in hardware table 182. During a DoS attack, the same unknown destination MAC address continues to generate the exception until the unknown destination MAC address is included in hardware table 182. To prevent such an attack, progressive MAC address learning uses the LiP bit. Upon detecting the exception, the hardware driver of switch 103 (e.g., the application-specific integrated circuit (ASIC) driver) sets the LiP bit and provides the unknown destination MAC address from forwarding table 181 to the layer-2 management apparatus of switch 103. The apparatus clears the LiP bit while creating an entry comprising the MAC address in hardware table 182. When the MAC address is not present in forwarding table 181, the hardware driver can clear the LiP bit. In this way, the unknown destination MAC address of a DoS attack does not repeatedly occupy resources of switch 103.

In some embodies diments, a respective member switch of network 100 (e.g., switch 103) runs a control plane with automatic configuration capabilities (e.g., based on IP or Fibre Channel (FC)) and forms a logical Ethernet switch based on the automatic configuration capabilities of the control plane. To an external end device, such as end device 112, network 100 can appear as a single Ethernet switch. Upon joining network 100 via the control plane, a respective member switch receives an automatically assigned identifier corresponding to the logical Ethernet switch. However, unlike an FC fabric, the data packets in network 100 can be encapsulated and forwarded based on another forwarding protocol. Examples of this forwarding protocol include, but are not limited to, Ethernet, TRILL, and IP. Furthermore, a respective member switch of network 100 can be associated with a group identifier, which identifies network 100 as a group of interconnected switches. If network 100 is a fabric switch, this group identifier can be a fabric identifier identifying the fabric switch.

In some embodiments, network 100 maintains a port profile for a respective virtual machine. A port profile represents Fibre Channel over Ethernet (FCoE) configuration, VLAN configuration, data center bridging (DCB) configuration, quality of service (QoS) configuration, and/or security configuration of one or more virtual machines. The MAC address of a virtual machine associates the corresponding port profile with the virtual machine. If a switch receives a packet with a source MAC address not associated with a port profile from a hypervisor or with a conflicting MAC address, the switch floods the packet in the network. Port profile management in a switch is specified in U.S. Patent Publication No. 2011/0299413, titled "Port profile management for virtual cluster switching," the disclosure of which is incorporated herein in its entirety.

Figure 1B:
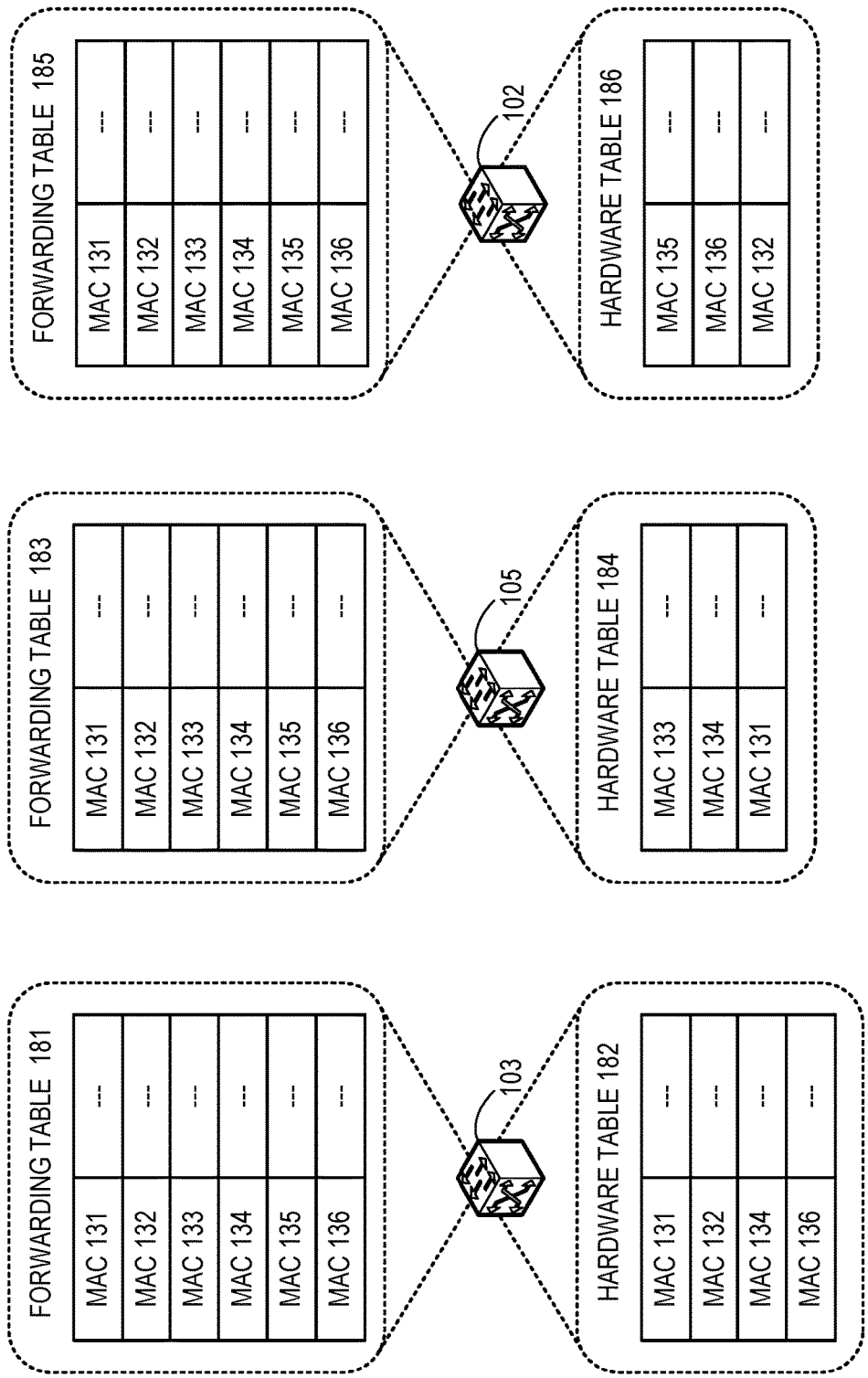
FIG. 1B illustrates exemplary forwarding and hardware tables for supporting progressive MAC address learning, in accordance with an embodiment of the present invention.

Suppose that end device 112 is in communication with end device 116 and end device 111 is in communication with end device 114. Hence, switch 103 considers the MAC addresses of end devices 114 and 116 as conversational MAC addresses. Similarly, switch 102 considers end device 112's MAC address and switch 105 considers end device 111's MAC address as conversational MAC addresses. FIG. 1B illustrates exemplary forwarding and hardware tables for supporting progressive MAC address learning, in accordance with an embodiment of the present invention. In this example, the MAC addresses of end devices 111-116 are MAC addresses 131-136, respectively.

Suppose that a respective switch of network 100 has learned, either locally or remotely, MAC addresses 131-136. Hence, forwarding tables 181, 183, and 185 of switches 103, 105, and 102, respectively, include forwarding entries comprising MAC addresses 131-136. On the other hand, hardware table 182 of switch 103 includes locally learned MAC addresses 131 and 132, and conversational MAC addresses 134 and 136 of end devices 114 and 116, respectively. Similarly, hardware table 184 of switch 105 includes locally learned MAC addresses 133 and 134, and conversational MAC address 131 of end device 111; and hardware table 186 of switch 102 includes locally learned MAC addresses 135 and 136, and conversational MAC address 132 of end device 112.

In some embodiments, progressive MAC address learning can be based on a respective hardware chip. FIG. 1C illustrates exemplary progressive MAC address learning in switch hardware, in accordance with an embodiment of the present invention. In conventional MAC address learning (i.e., source MAC address learning), if a MAC address is learned from a port of a particular hardware chip (e.g., an ASIC chip), the learned MAC address is replicated to all chips of the switch to facilitate switching decisions. Suppose that switch 103 includes chips 152, 154, and 156. An edge port on chip 152 couples end device 111, an edge port on chip 156 couples end device 112, and an inter-switch port on chip 154 couples switch 102.

In conventional MAC address learning, the MAC addresses of end devices 111 and 112 are shared among chips 152, 154, and 156. However, the number of MAC addresses learned at switch 103 can be high. To solve this problem, the hardware table in a chip, which is not in communication with a remote MAC address, does not include the remote MAC address. For example, since end device 111 is coupled to chip 152 and is in communication with end device 116, the hardware table of chip 152 includes MAC address 136. Similarly, since end device 112 is coupled to chip 156 and is in communication with end device 114, the hardware table of chip 156 includes MAC address 134.

However, the hardware table of chip 152 does not include MAC address 134, and the hardware table of chip 156 does not include MAC address 136. If an end device coupled with chip 152 starts communicating with end device 114, the layer-2 management apparatus of switch 103 creates an entry in the hardware table of chip 152 comprising MAC address 134 from forwarding table 181. This allows a switch to support progressive MAC address learning for a respective chip in the switch. In some embodiments, switch 103 adds the entry comprising MAC address 134 to the download list of chip 152.

Progressive MAC Address Learning

Figure 2A:
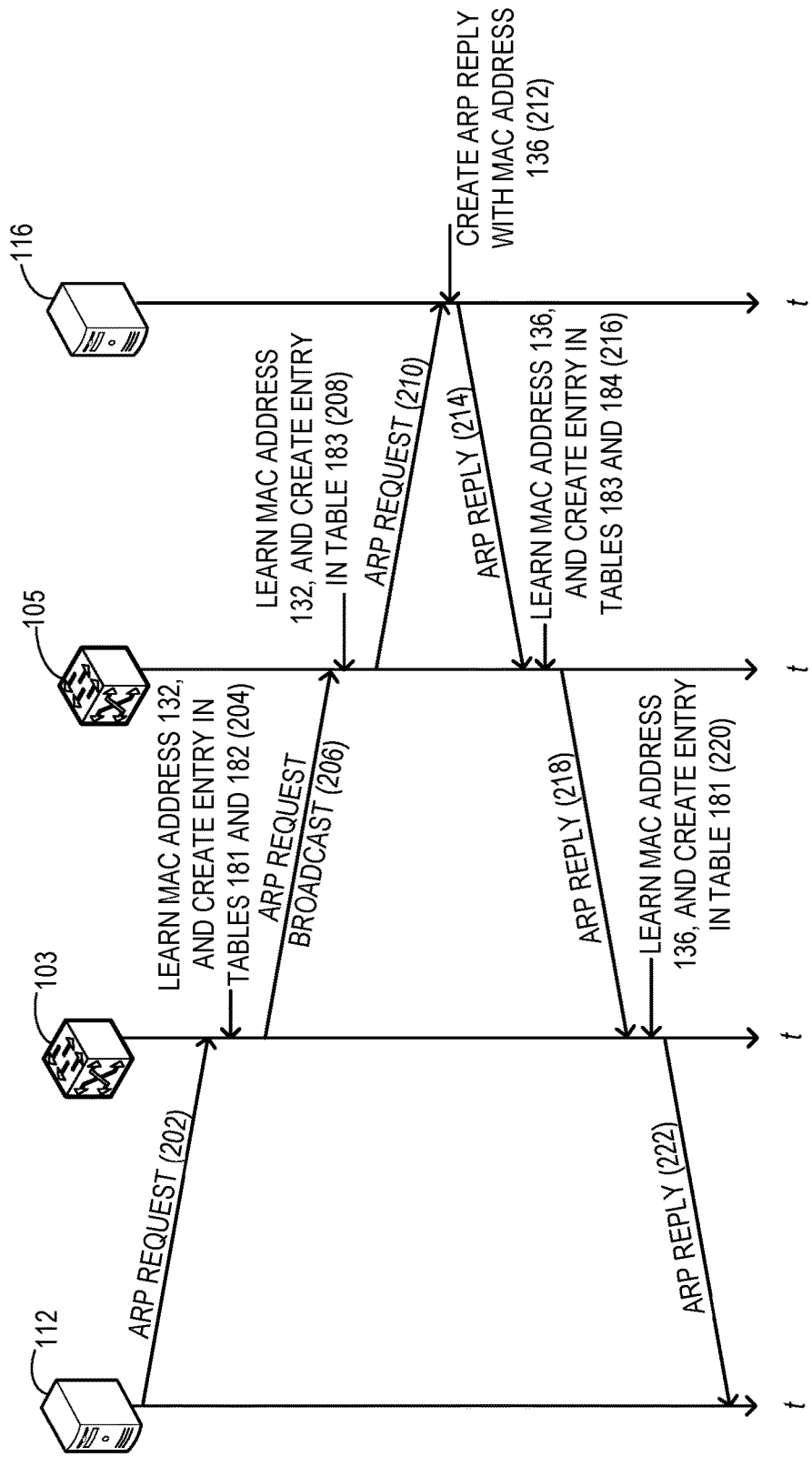
FIG. 2A illustrates an exemplary progressive MAC address learning process based on an Address Resolution Protocol (ARP) request, in accordance with an embodiment of the present invention.

FIG. 2A illustrates an exemplary progressive MAC address learning process based on an ARP request, in accordance with an embodiment of the present invention. During operation, end device 112 sends an ARP request for the IP address of end device 116 (operation 202). Upon receiving the ARP request, switch 103 learns MAC address 132 of end device 112, and since MAC address 132 is a locally learned MAC address, creates corresponding entries in both forwarding table 181 and hardware table 182 (operation 204). Since the ARP request is a broadcast message, switch 103 forwards the ARP request to a respective other switch in network 100 (operation 206). In some embodiments, switch 103 can use a all-switch multicast tree in network 100 to distribute the ARP request.

Upon receiving the ARP request, switch 105 learns MAC address 132. Since MAC address 132 is learned via an inter-switch port, switch 105 creates a corresponding entry only in forwarding table 183 (operation 208). This entry can include an identifier of (or a bitmap associated with) switch 103. Switch 105 forwards the ARP request via a respective edge port (operation 210). As a result, end device 116, which is coupled to switch 105 via an edge port, receives the ARP request. Since the ARP request is for the IP address of end device 116, end device 116 creates an ARP reply comprising MAC address 136 of end device 116 (operation 212). End device 116 then sends the ARP reply to switch 105 (operation 214).

Switch 105 receives the ARP reply, learns MAC address 136, and since MAC address 136 is a locally learned MAC address, creates corresponding entries in both forwarding table 183 and hardware table 184 (operation 216). Since the ARP reply is a unicast message to end device 112, switch 105 forwards the ARP reply to switch 103 (operation 218). Switch 103 receives the ARP reply, learns MAC address 136, and since MAC address 136 is learned via an inter-switch port, creates a corresponding entry only in forwarding table 181 (operation 220). Switch 103 then forwards the ARP reply to end device 112 (operation 222).

Figure 2B:
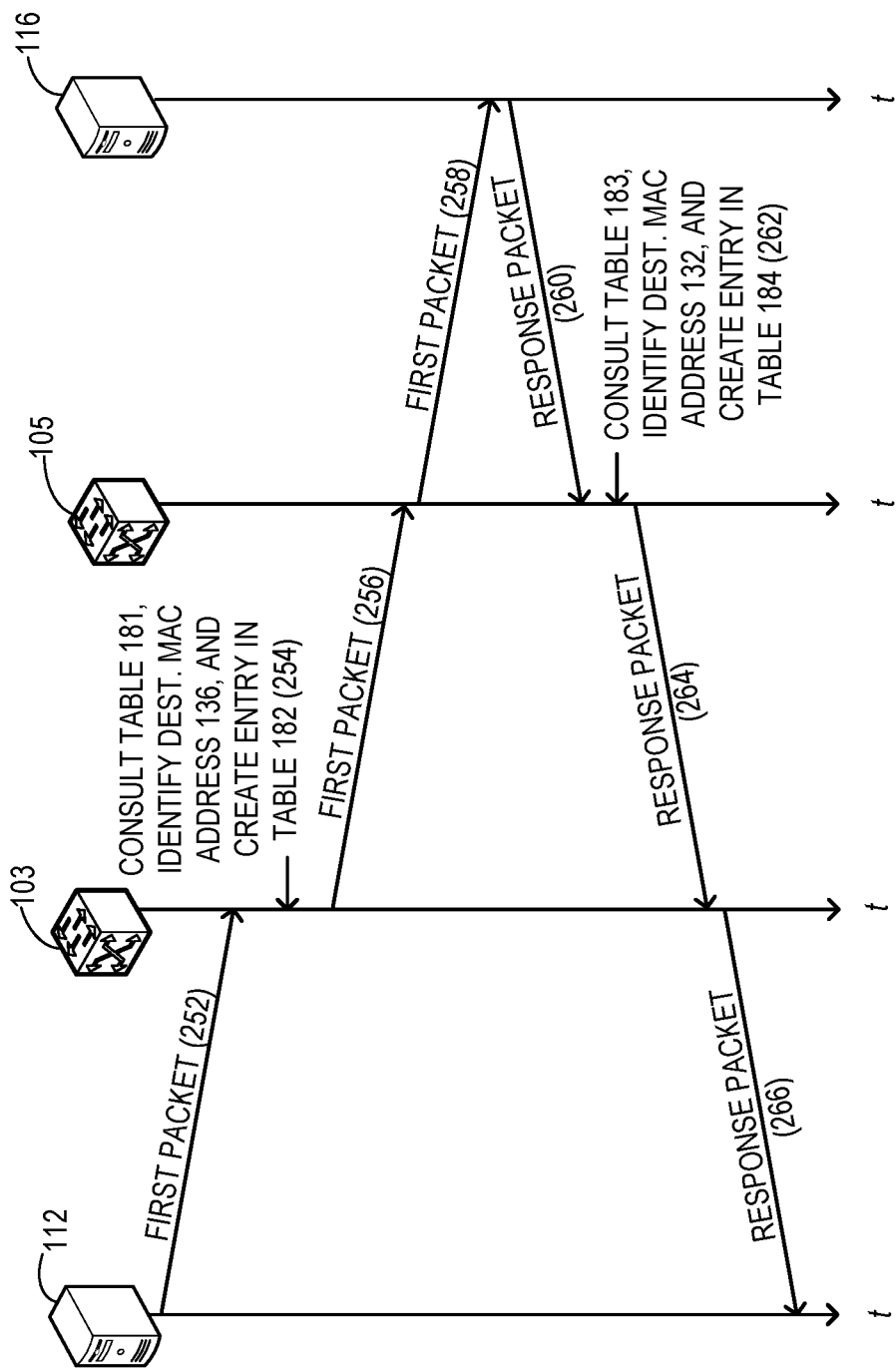
FIG. 2B illustrates an exemplary progressive MAC address learning process based on an initial communication from an end device, in accordance with an embodiment of the present invention.

Upon receiving the ARP reply with MAC address 136, end device 112 initiates its communication with end device 116. FIG. 2B illustrates an exemplary progressive MAC address learning process based on an initial communication from an end device, in accordance with an embodiment of the present invention. During operation, end device 112 sends its first packet for end device 116 to switch 103 (operation 252). Upon receiving the first packet, switch 103 determines that the destination MAC address of the first packet, which is MAC address 136, is not present in hardware table 182. Switch 103 then consults forwarding table 181, identifies destination MAC address 136, and creates a corresponding entry in hardware table 182 (operation 254).

Based on the entry in hardware table 182, switch 103 forwards the first packet to switch 105 (operation 256). Switch 105 forwards the first packet to end device 116 (operation 258). End device 116 then sends a response packet to switch 105 (operation 260). Upon receiving the response packet, switch 105 determines that the destination MAC address of the response packet, which is MAC address 132, is not present in hardware table 184. Switch 105 then consults forwarding table 183, identifies destination MAC address 132, and creates a corresponding entry in hardware table 184 (operation 262). Based on the entry in hardware table 184, switch 105 forwards the response packet to switch 103 (operation 264). Switch 105 forwards the response packet to end device 112 (operation 266).

Operations

Figure 3A:
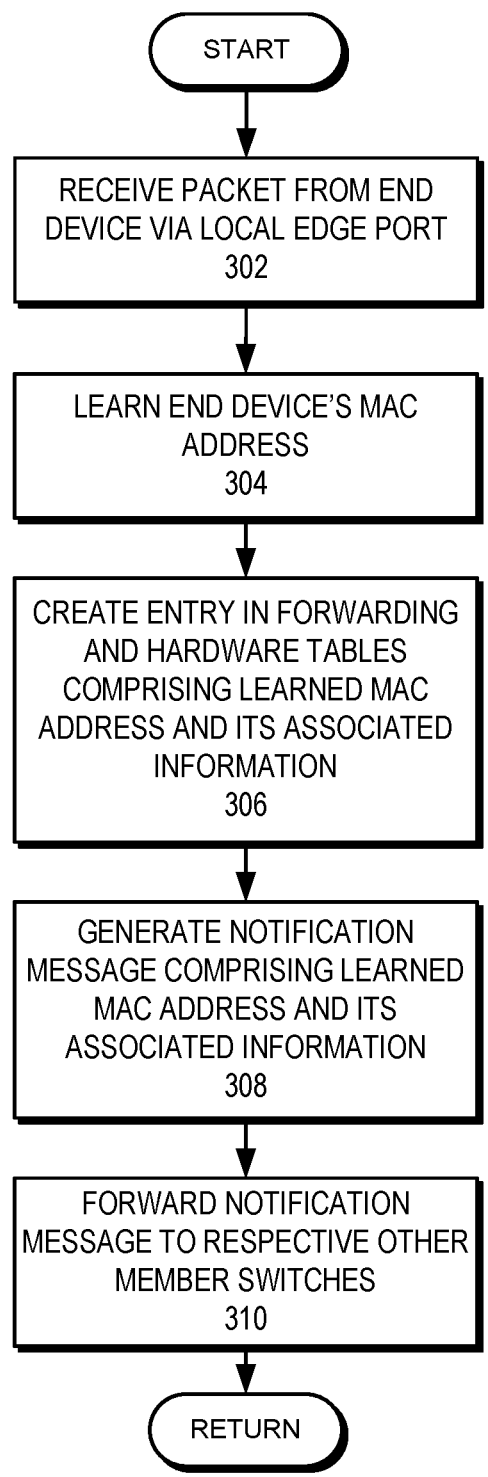
FIG. 3A presents a flowchart illustrating the process of a switch learning a progressive MAC address via a local edge port, in accordance with an embodiment of the present invention.

FIG. 3A presents a flowchart illustrating the process of a switch learning a progressive MAC address via a local edge port, in accordance with an embodiment of the present invention. During operation, the switch receives a packet (e.g., an Ethernet frame comprising an IP packet) from an end device via a local edge port (operation 302). The switch learns the end device's MAC address (operation 304) and creates an entry in the forwarding and hardware tables comprising the learned MAC address and its associated information (operation 306). Associated information includes, but is not limited to, an egress port (e.g., from which the MAC address has been learned), a corresponding VLAN tag, and one or more flags (e.g., to indicate flooding, download to hardware table, etc).

In some embodiments, the switch shares a respective learned MAC address with other switches of the network (e.g., in a fabric switch). The switch then generates a notification message comprising the learned MAC address and its associated information (operation 308) and forwards the notification message to a respective other member switch of the network (operation 310). In some embodiments, the notification message is a control message, which carries the learned MAC address in its payload. This control message can be encapsulated in an encapsulation header (e.g., a fabric or tunnel encapsulation header). The switch can forward the notification message via an all-switch multicast tree in the network.

Figure 3B:
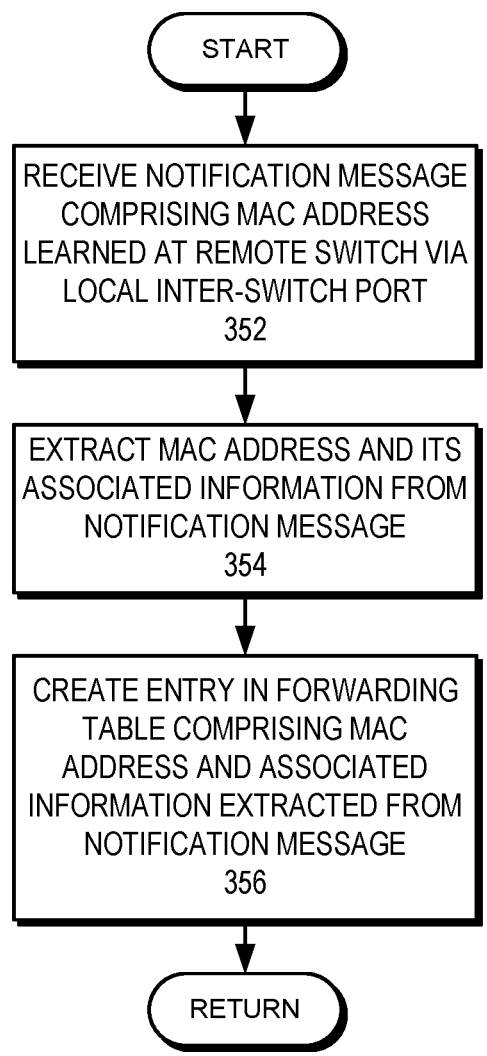
FIG. 3B presents a flowchart illustrating the process of a switch learning a progressive MAC address from a notification message, in accordance with an embodiment of the present invention.

FIG. 3B presents a flowchart illustrating the process of a switch learning a progressive MAC address from a notification message, in accordance with an embodiment of the present invention. During operation, the switch receives a notification message comprising a MAC address learned at a remote switch (i.e., at a port in the remote switch) via a local inter-switch port (operation 352). If the notification message is encapsulated in an encapsulation header, the switch can decapsulate the encapsulation header. The switch extracts the MAC address and its associated information from the notification message (operation 354). The switch then creates an entry in the local forwarding table comprising the MAC address and its associated information extracted from the notification message (operation 356).

When a switch learns a MAC address based on progressive MAC address learning and has an entry comprising the learned MAC address in the hardware table, an aging out event (e.g., a timeout exception) can occur due to inactivity of that MAC address. For example, the MAC address may no longer be involved (e.g., as a source or destination address) in an active communication. A switch can maintain the aging out process at a switch-level or at a chip-level. When an entry comprising a conversational MAC address ages out in the hardware table, the switch removes the entry from the hardware table. The switch also unsets the flag indicating that the MAC address is a conversational MAC address in the corresponding entry in the forwarding table.

Figure 3C:
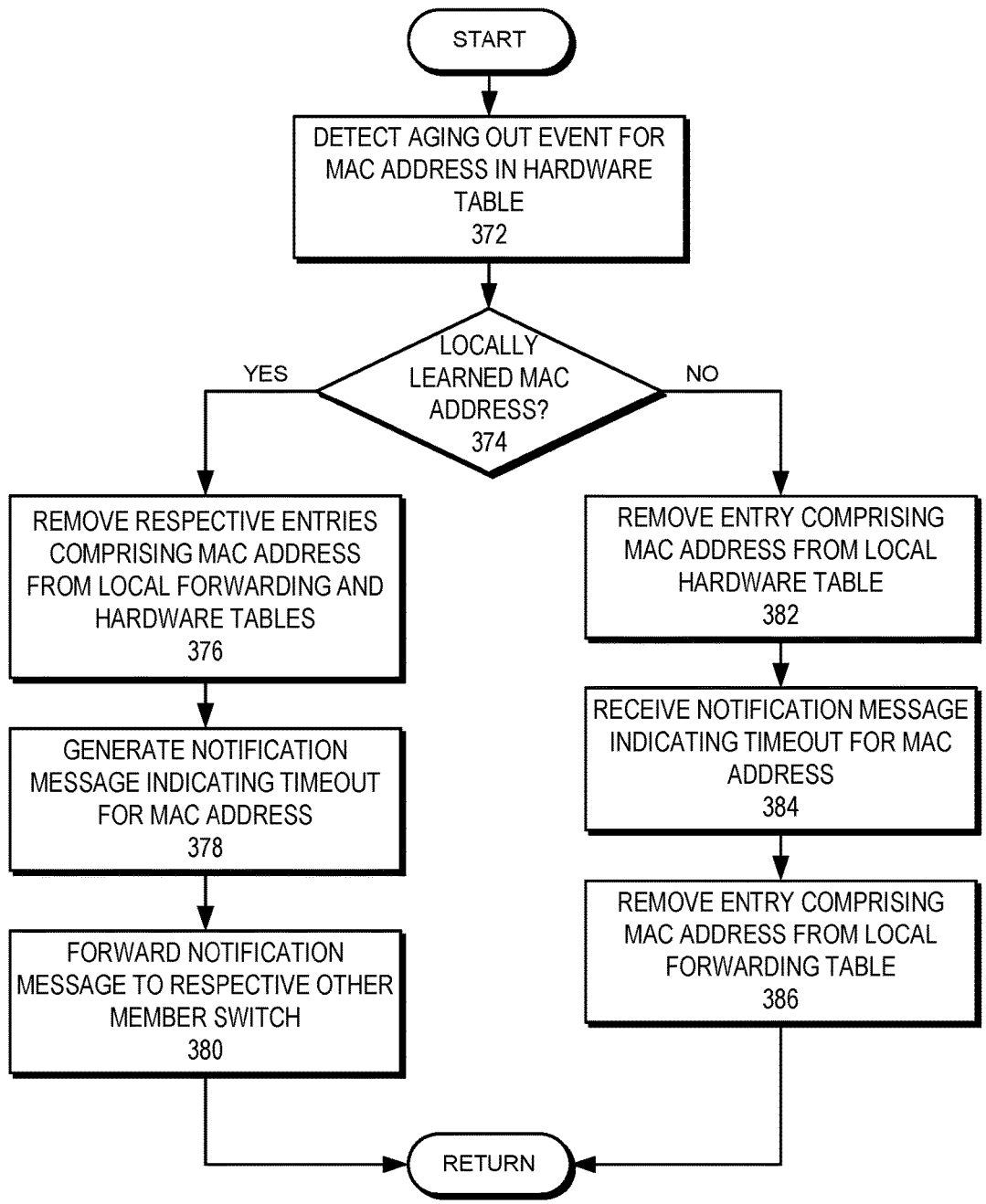
FIG. 3C presents a flowchart illustrating the process of a switch timing out a learned MAC address, in accordance with an embodiment of the present invention.

FIG. 3C presents a flowchart illustrating the process of a switch timing out a learned MAC address, in accordance with an embodiment of the present invention. During operation, the switch detects an aging event for a MAC address in the hardware table (operation 372). The switch then checks whether the MAC address is a locally learned MAC address (i.e., learned from a local edge port) (operation 374). If the MAC address is a locally learned MAC address, the switch removes the respective entries comprising the MAC address from the local forwarding and hardware tables (operation 376). The switch generates a notification message indicating the aging out for the MAC address (e.g., a control message for clearing a learned MAC address) (operation 378). The switch then forwards the notification message to a respective other member switch (operation 380).

On the other hand, if the MAC address is not a locally learned MAC address, the switch removes the entry comprising the MAC address from the local hardware table (operation 382). The switch receives a notification message indicating the aging out for the MAC address (e.g., a control message for clearing the MAC address from a remote switch) (operation 384). The switch then removes the entry comprising the MAC address from the local forwarding table (operation 386).

Figure 4:
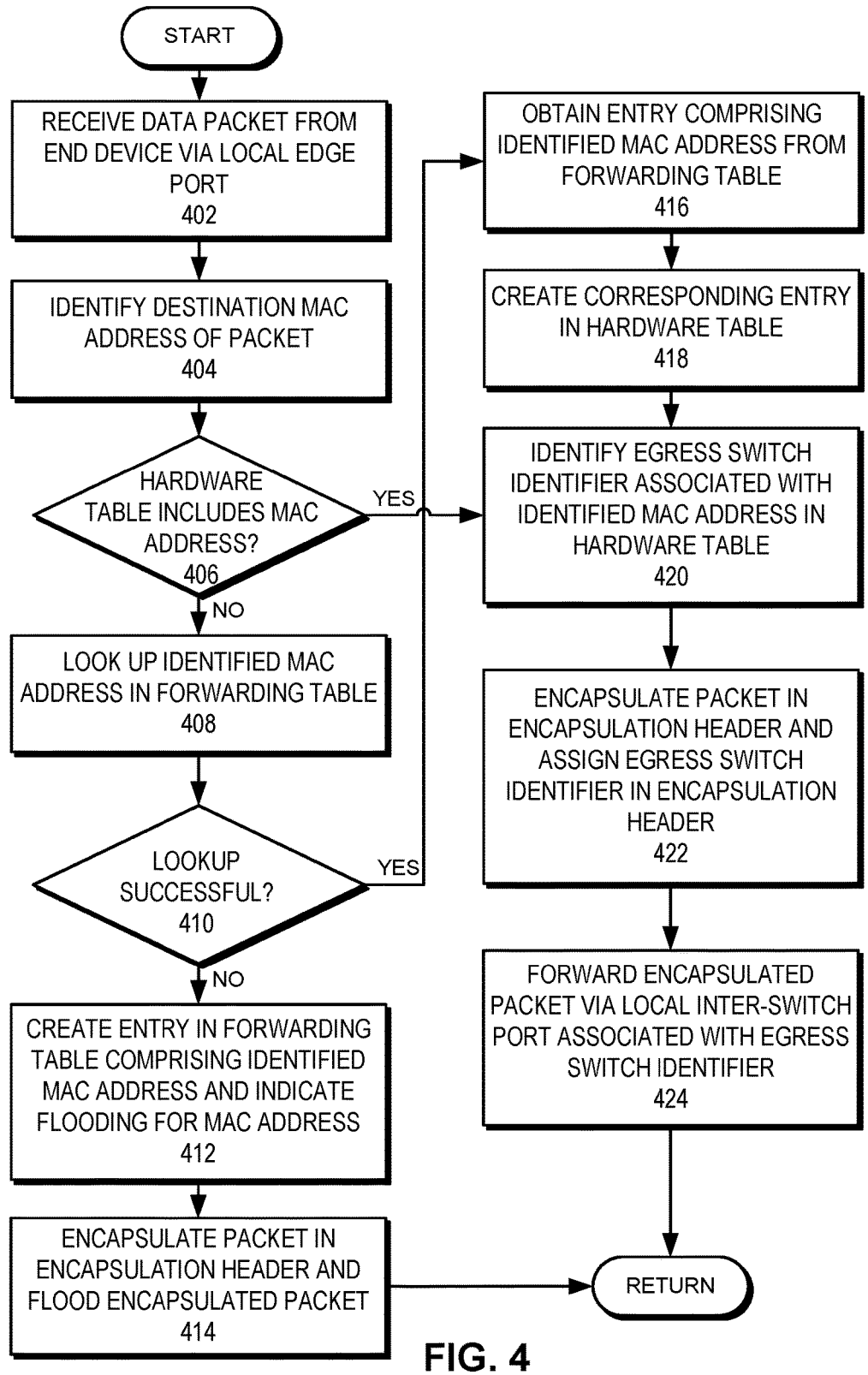
FIG. 4 presents a flowchart illustrating the process of a switch forwarding a packet based on learned progressive MAC addresses, in accordance with an embodiment of the present invention.

FIG. 4 presents a flowchart illustrating the process of a switch forwarding a packet based on learned progressive MAC addresses, in accordance with an embodiment of the present invention. During operation, the switch receives a data packet via a local edge port (operation 402) and identifies the destination MAC address of the packet (operation 404). The switch checks whether the local hardware table includes the identified MAC address (i.e., the identified MAC address has a corresponding entry in the hardware table) (operation 406). If the hardware table does not include the identified MAC address, the switch looks up (i.e., searches for) the identified MAC address in the forwarding table (operation 408) and checks whether the lookup has been successful (operation 410).

If the lookup has not been successful, switches in the network have not learned the MAC address yet. Hence, the switch creates an entry in the forwarding table comprising the identified MAC address and indicates flooding for the MAC address (operation 412). This prevents multiple exceptions for the same unknown MAC address. The switch then encapsulates the packet in an encapsulation header and floods the encapsulated packet in the network (operation 414). It should be noted that the switch also floods the received packet via its local edge ports. In some embodiments, to flood the packet in the network, the switch assigns a multi-destination identifier as the egress switch identifier of the encapsulation header. The switch then forwards the encapsulated packet based on the multi-destination identifier. For example, the switch may forward the packet via a multicast tree which includes a respective switch of the network.

If the lookup has been successful, the switch has found the MAC address in the forwarding table. The switch then obtains the entry comprising the identified MAC address from the forwarding table (operation 416) and creates a corresponding entry in the hardware table (operation 418), as described in conjunction with FIG. 1B. If the hardware table includes the identified MAC address (operation 406) or the switch has created a entry comprising the identified MAC address in the hardware table (operation 418), the switch identifies an egress switch identifier associated with the identified MAC address in the hardware table (operation 420).

The switch then encapsulates the packet in an encapsulation header and assigns the egress switch identifier in the encapsulation header (operation 422). The switch forwards the encapsulated packet via a local inter-switch port associated with the egress switch identifier (operation 424). It should be noted that if the destination MAC address is a local MAC address, the switch can switch the received packet to that destination MAC address without encapsulating the packet based on layer-2 frame switching.

Link Aggregation Group (LAG)

Figure 5A:
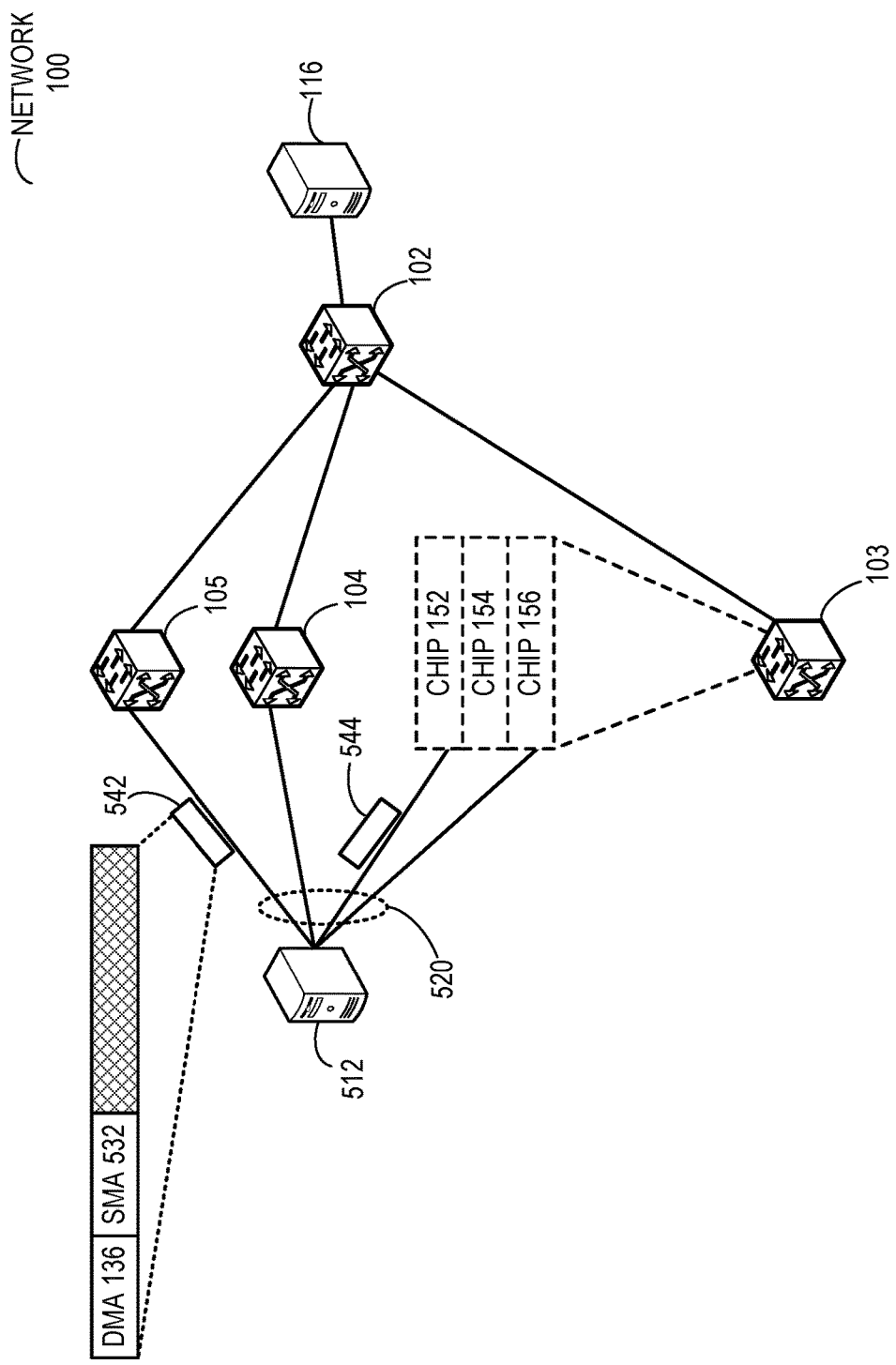
FIG. 5A illustrates an exemplary virtual link aggregation group with support for progressive MAC address learning, in accordance with an embodiment of the present invention.

FIG. 5A illustrates an exemplary virtual link aggregation group with support for progressive MAC address learning, in accordance with an embodiment of the present invention. In this example, switches 103, 104, and 105 couple an end device 512 via a virtual link aggregation group (VLAG) 520. Switches 103, 104, and 105 are configured to operate in a special "trunked" mode for end device 512. End device 512 views switches 103, 104, and 105 as a common virtual switch, with a corresponding virtual address. End device 512 is considered to be logically coupled to the virtual switch via logical links.

The virtual switch is considered to be logically coupled to switches 103, 104, and 105, optionally with zero-cost links. While forwarding data frames from end device 512, switches 104 and 105 mark the data frames with the virtual switch's address as their source address. As a result, other switches in network 100 can learn that end device 512 is reachable via the virtual switch. Hence, multi-pathing can be achieved when other switches choose to send data frames to the virtual switch (which is marked as the egress switch in the frames) via switches 103, 104, and 105.

In the following description, switches which participate in virtual link aggregation group 520 are referred to as "partner switches." Since the three partner switches function as a single logical switch, the MAC address reachability learned by a respective switch is shared with the other partner switch. For example, during normal operation, end device 512 may choose to send its outgoing data frames only via the link to switch 105. As a result, only switch 105 would learn end device 512's MAC address 532. This information is then shared by switch 105 with switches 103 and 104.

However, a hardware table in a switch (or in a chip) includes a conversational MAC address if that switch (or chip) has actively participated in a communication. During operation, end device 512 communicates with end device 116. End device 512 sends a packet 542 to end device 116. Packet 542 includes MAC address 532 as the source MAC address and MAC address 136 as the destination MAC address. Switch 105 receives packet 542 and identifies destination MAC address 136 as a conversational MAC address. Switch 105 then obtains MAC address 136 from the local forwarding table and creates an entry comprising MAC address 136 in the local hardware table. On the other hand, since switch 104 has not received a packet for this communication, switch 104's hardware table does not include MAC address 136.

Suppose that end device 512 is coupled with chips 152 and 156 of switch 103 and the links coupling these chips participate in virtual link aggregation group 520. These links form a link aggregation group (LAG) between end device 512 and switch 103. End device 512 sends a packet 544 to end device 116. Packet 544 includes MAC address 532 as the source MAC address and MAC address 136 as the destination MAC address. Chip 152 receives packet 544, identifies MAC address 532 as a conversational MAC address, and includes MAC address 136 in the hardware table of chip 152. On the other hand, since chip 156 has not received a packet for this communication, chip 156's hardware table does not include MAC address 136, as described in conjunction with FIG. 1C.

Figure 5B:
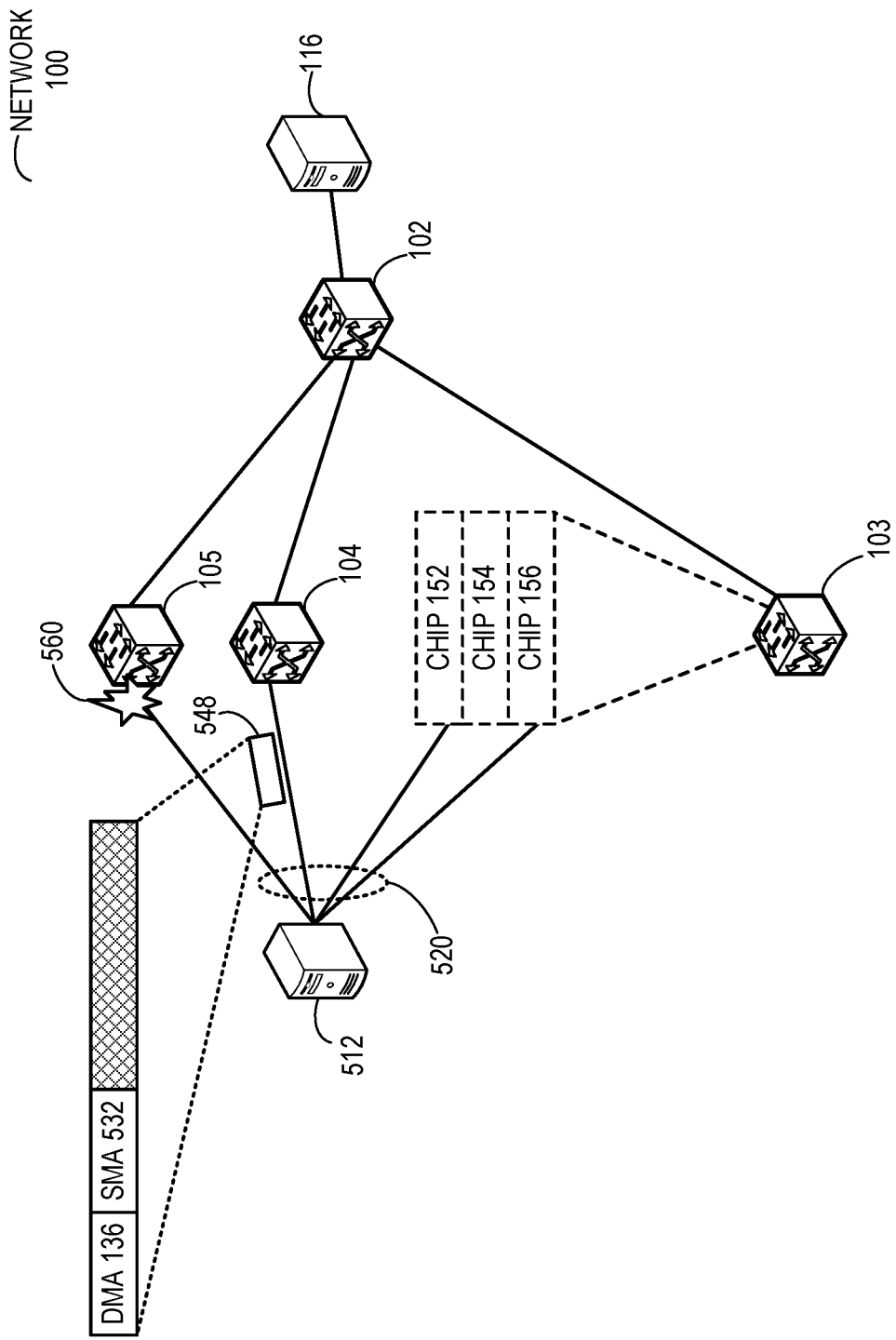
FIG. 5B illustrates an exemplary high-availability for a virtual link aggregation group with support for progressive MAC address learning, in accordance with an embodiment of the present invention.

FIG. 5B illustrates an exemplary high-availability for a virtual link aggregation group with support for progressive MAC address learning, in accordance with an embodiment of the present invention. Suppose that a failure 560, which can be a link failure, a node failure, or both, makes switch 105 unreachable from end device 512. As a result, switch 105 becomes unavailable in virtual link aggregation group 520. End device 512 then stops forwarding traffic via the port(s) coupling switch 105 and diverts that traffic to other active ports in virtual link aggregation group 520. If the diverted traffic flows to a chip or switch in which MAC address 136 is already in the hardware table, communication between end devices 512 and 116 continues via that chip or switch.

On the other hand, the diverted traffic can flow to a new chip or switch in which MAC address 136 has not been in the hardware table. The chip or node then looks up in the local forwarding table the entry comprising MAC address 136 and creates a corresponding entry in the local hardware table. For example, end device 512 can send a packet 548 to switch 104. Packet 548 includes MAC address 532 as the source MAC address and MAC address 136 as the destination MAC address. Switch 104 receives packet 542 and identifies destination MAC address 136 as a conversational MAC address. Switch 104 then obtains the entry comprising MAC address 136 from the local forwarding table and creates a corresponding entry comprising MAC address 136 in the local hardware table.

Exemplary Switch

Figure 6:
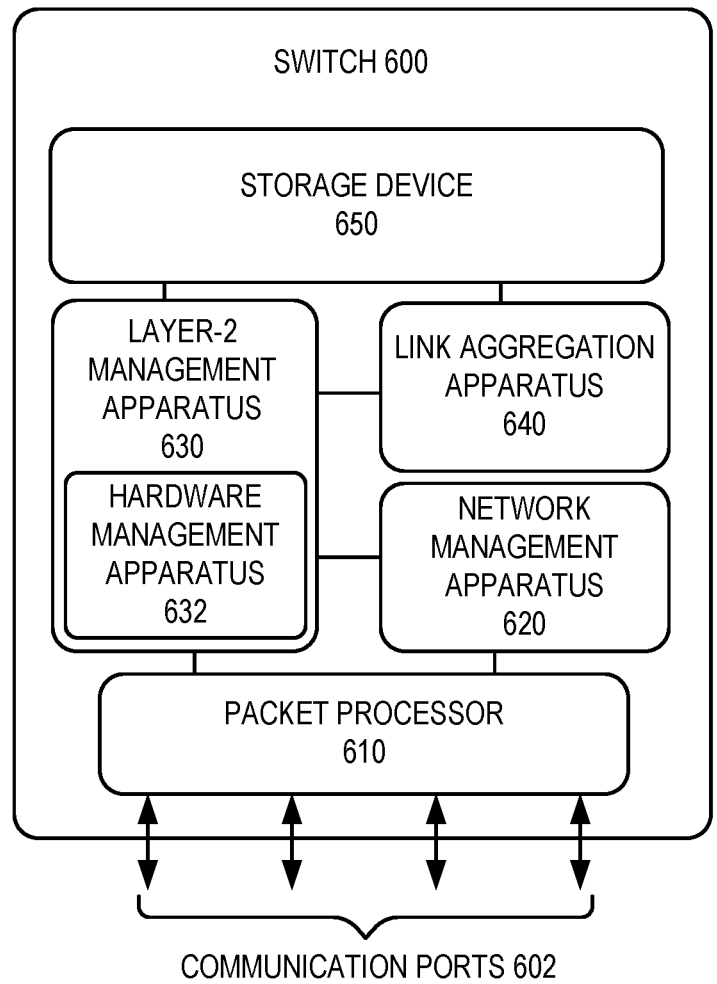
FIG. 6 illustrates an exemplary switch with support for progressive MAC address learning, in accordance with an embodiment of the present invention.

FIG. 6 illustrates an exemplary switch with support for progressive MAC address learning, in accordance with an embodiment of the present invention. In this example, a switch 600 includes a number of communication ports 602, a packet processor 610, a layer-2 management apparatus 630, a hardware management apparatus 632, and a storage device 650. In some embodiments, packet processor 610 adds an encapsulation header to a packet. In some embodiments, switch 600 includes a network management apparatus 620, which maintains a membership in a network of interconnected switches (e.g., in a fabric switch). A respective switch of the network is associated with a group identifier identifying the network.

In some embodiments, the network is a fabric switch. Switch 600 maintains a configuration database in storage device 650 that maintains the configuration state of a respective switch within the fabric switch. Network management apparatus 620 maintains the state of the fabric switch, which is used to join other switches. Under such a scenario, communication ports 602 can include inter-switch communication channels for communication within a fabric switch. This inter-switch communication channel can be implemented via a regular communication port and based on any open or proprietary format (e.g., a TRILL or IP protocol).

Storage device 650 stores a forwarding table, which includes an entry comprising a MAC address and an egress port for the MAC address. Hardware management apparatus 632 determines whether a destination MAC address of a frame is present in a hardware table in memory of switch 600. Layer-2 management apparatus 630, in response to a determination that the destination MAC address is not present in the hardware table, looks up a first entry comprising the destination MAC address in the forwarding table, and creates a second entry comprising the destination MAC address in the hardware table based on the first entry.

In some embodiments, switch 600 also includes a learning management apparatus 640, which learns a first MAC address from a local edge port. Layer-2 management apparatus 630 then creates respective entries in the forwarding and hardware tables comprising the learned MAC address. Learning management apparatus 640 can also extract a remote MAC address learned at a port of a second switch from a payload of a notification message. Layer-2 management apparatus 630 then creates an entry in the forwarding table comprising the remote MAC address.

Layer-2 management apparatus 630, in response to a determination that the destination MAC address is present in the hardware table, identifies an egress port for the frame from an entry comprising the destination MAC address in the hardware table. If the frame has been received via a first port (e.g., one of the communication ports 602) in a first chip of switch 600, layer-2 management apparatus 630 is precluded from creating an entry comprising the destination MAC address in a hardware table of a second chip of switch 600.

Layer-2 management apparatus 630 clears the second entry in response to identifying an aging out event for the destination MAC address. However, the first entry remains in the forwarding table. On the other hand, layer-2 management apparatus 630 clears the first entry in response to identifying an aging out event of a remote switch in a notification message. Layer-2 management apparatus 630, in response to determining a failure to the lookup, floods the frame in the network.

Note that the above-mentioned modules can be implemented in hardware as well as in software. In one embodiment, these modules can be embodied in computer-executable instructions stored in a memory which is coupled to one or more processors in switch 600. When executed, these instructions cause the processor(s) to perform the aforementioned functions.

In summary, embodiments of the present invention provide a switch and a method for scalable MAC address learning. In one embodiment, the switch includes a storage device, a hardware management apparatus, and a layer-2 management apparatus. The storage device stores a forwarding table, which includes an entry comprising a MAC address and an egress port for the MAC address. The hardware management apparatus determines whether a destination MAC address of a frame is present in a hardware table in memory of the switch. The layer-2 management apparatus, in response to a determination that the destination MAC address is not present in the hardware table, looks up a first entry comprising the destination MAC address in the forwarding table, and creates a second entry comprising the destination MAC address in the hardware table based on the first entry.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
a storage device configured to store one or more forwarding entries;
a content-addressable memory, which is separate from the storage device, configured to store a forwarding data structure; and
management circuitry configured to:
in response to determining that a destination MAC address of a data frame is not present in the forwarding data structure, identify the destination MAC address and a corresponding egress port in the storage device;
create a forwarding entry comprising the destination MAC address in the forwarding data structure; and
determine an egress port for the data frame based on the forwarding entry in the forwarding data structure.

2. The switch of claim 1, further comprising learning management circuitry configured to learn a second MAC address from an edge port of the switch; and
wherein the management circuitry is further configured to store the second MAC address in the storage device and the forwarding data structure.

3. The switch of claim 1, wherein the management circuitry is further configured to remove the destination MAC address from the forwarding data structure in response to identifying an aging out event for the destination MAC address, wherein the destination MAC address remains in the storage device.

4. The switch of claim 3, wherein the management circuitry is further configured to remove the destination MAC address from the storage device in response to identifying an aging out event of the destination MAC address in a notification message from a remote switch, wherein the destination MAC address has been learned at a port of the remote switch.

5. The switch of claim 3, wherein the management circuitry is further configured to remove the destination MAC address from the storage device in response to determining that the destination MAC address is locally learned.

6. The switch of claim 1, wherein the content-addressable memory is in a first chip of the switch; and
wherein the management circuitry is precluded from storing the destination MAC address in a second content-addressable memory of a second chip of the switch.

7. The switch of claim 1, wherein the storage device is further configured to store an indicator indicating whether the destination MAC address is locally learned.

8. The switch of claim 1, wherein the switch is a member switch of a network of interconnected switches; and
wherein the management circuitry further configured to, in response to determining that a second destination MAC address of a second data frame is not present in the forwarding data structure and the storage device, identify a multicast tree in the network of interconnected switches for forwarding the second data frame.

9. The switch of claim 1, wherein the management circuitry is further configured to store a second MAC address learned at a remote switch in the storage device without storing the second MAC address in the forwarding data structure.

10. The switch of claim 9, wherein the management circuitry is further configured to store the second MAC address in the forwarding data structure in response to identifying the second MAC address in a second data frame.

11. A method, comprising:
storing one or more forwarding entries in a storage device of a switch;
storing a forwarding data structure in a content-addressable memory, which is separate from the storage device, of the switch;
in response to determining that a destination MAC address of a data frame is not present in the forwarding data structure, identifying the destination MAC address and a corresponding egress port in the storage device;
creating a forwarding entry comprising the destination MAC address in the forwarding data structure; and
determining an egress port for the data frame based on the forwarding entry in the forwarding data structure.

12. The method of claim 11, further comprising:
learning a second MAC address from an edge port of the switch; and
storing the second MAC address in the storage device and the forwarding data structure.

13. The method of claim 11, further comprising removing the destination MAC address from the forwarding data structure in response to identifying an aging out event for the destination MAC address, wherein the destination MAC address remains in the storage device.

14. The method of claim 13, further comprising removing the destination MAC address from the storage device in response to identifying an aging out event of the destination MAC address in a notification message from a remote switch, wherein the destination MAC address has been learned at a port of the remote switch.

15. The method of claim 13, further comprising removing the destination MAC address from the storage device in response to determining that the destination MAC address is locally learned.

16. The method of claim 11, wherein the content-addressable memory is in a first chip of the switch; and
wherein the switch is precluded from storing the destination MAC address in a second content-addressable memory of a second chip of the switch.

17. The method of claim 11, further comprising storing, in the storage device, an indicator indicating whether the destination MAC address is locally learned.

18. The method of claim 11, wherein the switch is a member switch of a network of interconnected switches; and
wherein the method further comprises, in response to determining that a second destination MAC address of a second data frame is not present in the forwarding data structure and the storage device, identifying a multicast tree in the network of interconnected switches for forwarding the second data frame.

19. The method of claim 11, further comprising storing a second MAC address learned at a remote switch in the storage device without storing the second MAC address in the forwarding data structure.

20. The method of claim 11, further comprising storing the second MAC address in the forwarding data structure in response to identifying the second MAC address in a second data frame.

* * * * *